United States Patent [19]
Waibel et al.

[11] Patent Number: 5,712,957
[45] Date of Patent: Jan. 27, 1998

[54] LOCATING AND CORRECTING ERRONEOUSLY RECOGNIZED PORTIONS OF UTTERANCES BY RESCORING BASED ON TWO N-BEST LISTS

[75] Inventors: Alex H. Waibel; Arthur E. McNair, both of Pittsburgh, Pa.

[73] Assignee: Carnegie Mellon University, Pittsburgh, Pa.

[21] Appl. No.: 525,921

[22] Filed: Sep. 8, 1995

[51] Int. Cl.$^6$ ........................................................ G10L 5/06
[52] U.S. Cl. .......................... 395/2.49; 395/2.66; 395/2.87
[58] Field of Search .................................. 395/2.48, 2.49, 395/2.66, 2.87

[56] References Cited

U.S. PATENT DOCUMENTS

| 5,241,619 | 8/1993 | Schwartz et al. | 395/2.09 |
| 5,579,436 | 11/1996 | Chow et al. | 395/2.53 |

OTHER PUBLICATIONS

Bernard Suhm, Brad Myers and Alex Waibel, "Interactive Recovery from Speech Recognition Errors in Speech User Interfaces", Proceedings of the International Conference on Spoken Language Processing, ICSLP 96, Philadelphia, PA, Oct. 1996.

Hermann Hild and Alex Waibel (Stephen José Hanson ed., 1993), Connected Letter Recognition with a Multi–State Time Delay Neural Network, Neural Information Processing System 5, 1993, published by Morgan Kaufmann, S.F. California.

O. Schmidbauer et al., An LVQ Based Reference Model For Speaker–Adaptive Speech Recognition, IEEE Proceedings of the International Conference on Acoustics, Speech, and Signal Processing, Mar. 1992, Pittsburgh, PA.

*Primary Examiner*—Allen R. MacDonald
*Assistant Examiner*—Tálivaldis Ivars Šmits
*Attorney, Agent, or Firm*—Kirkpatrick & Lockhart LLP

[57] ABSTRACT

A method of repairing machine-recognized speech is comprised of the steps of receiving from a recognition engine a first n-best list of hypotheses and scores for each hypothesis generated in response to a primary utterance to be recognized. An error within the hypothesis having the highest score is located. Control signals are generated from the first n-best list which are input to the recognition engine to constrain the generation of a second n-best list of hypotheses, and scores for each hypothesis, in response to an event independent of the primary utterance. The scores for the hypotheses in the first n-best list are combined with the scores for the hypotheses in the second n-best list. The hypothesis having the highest combined score is selected as the replacement for the located error.

14 Claims, 5 Drawing Sheets

LOCATING AND CORRECTING ERRONEOUSLY RECOGNIZED PORTIONS OF UTTERANCES BY RESCORING BASED ON TWO N-BEST LISTS

BACKGROUND OF THE INVENTION

1. Field of the Invention

The present invention is directed generally to speech recognition systems, and more particularly to a method and apparatus for correcting and repairing speech recognized by such speech recognition systems.

2. Description of the Invention Background

The drive to make the man-machine interface more user-friendly has led researchers to create machines capable of understanding spoken commands. Speech recognition systems have been built which provide good results when the speech is limited to a particular list of commands, or a specialized vocabulary. Speech recognition systems typically do much worse at trying to recognize conversational English, either person to person or person to machine. That is because conversational English contains a wide variety of words, slang, and non-words such as "umm" and "uhh". Recognizing conversational English is also complicated by regional accents and poor enunciation. Finally, conversational English frequently contains numerous mistakes which typically do not impair a human listener's ability to understand the message, although such mistakes very often confuse a recognition system. Thus, the need arises to provide some mechanism to correct the speech recognized by a speech recognition system.

Based on our understanding of the various types of speech recognition systems currently sold in the marketplace, we believe that such systems may be divided into four types: recognition engines, command systems, dictation systems, and special purpose speech-driven applications.

Recognition engines are primarily software, which takes a single utterance as input, and produces a single hypothesis or n-best list as an output. No repair is provided with this type of system. Recognition engines may be either discrete-word or continuous-speech systems. With discrete-word systems, the recognizer can only recognize a single word at a time, so the user must pause between each word until the recognizer produces the output for the last word spoken.

Command-based recognition systems are generally used for single-word or few-word commands used to affect and control some system with speech. Most have a small, fixed vocabulary of between ten and one hundred commands that can be recognized in any one situation. None of the command-based systems of which we are aware has any kind of repair mechanism for repairing incorrect recognition. Instead, because there is a finite number of commands from which to chose at any given time, the system attempts to avoid incorrect recognitions by looking at a confidence score for each recognition. If the confidence score is below a predetermined threshold, the system will do nothing, and the user must repeat the command again and again until the score is above the threshold.

Dictation recognition systems must handle a very large vocabulary, up to tens of thousands of possible words, because they are used for dictating text of various kinds. All of the commercially available dictation systems of which we are aware are discrete-word systems. For such systems, the repair mechanisms are designed to repair only a single word at a time, and usually just the last word that has been spoken. If a recognition error occurred before the last word, the user must say "backup", or some other key word, which indicates that there was an error. The recognition system then goes into a repair mode for that word where the user can select the correct word by selecting an alternate word from a presented list of alternatives, or typing in the correct word.

There are also commercially available special purpose speech-driven applications. We have seen such applications developed for particular fields such as the medical and legal field. Such special-purpose applications may be set up to generate medical reports or complete legal forms. In such systems, continuous speech is allowed, but the possible variations of sentences that can be spoken is very limited. Because such systems recognize a whole utterance at a time, repair is performed by indicating an error, or not indicating that it was correctly recognized, and simply respeaking the whole utterance until it is recognized correctly.

In addition to the above-mentioned commercial systems, there are also several research systems under development. Such systems are typically built to handle a particular task, such as scheduling a meeting (Carnegie Mellon University's JANUS system), attaining airline information (U.S. Government sponsored ATIS Task), or obtaining information about a city (MIT's Voyager System). These systems are continuous speech systems which use an understanding component to extract the meaning from the text output by a speech recognizer. Such systems sometimes incorporate another type of repair mechanism not used in the commercially available systems, namely the method of initiating a directed disambiguation dialogue. The understanding component expects sentences to contain certain pieces of information. If one of those pieces is missing, due to a recognition error or due to the user simply leaving the information out, the understanding component will ask the user to repeat the missing piece of information. The question and answer dialogue will continue until the understanding component is satisfied that it has all the information.

Most current research in speech recognition focuses on the continuing improvement of large-vocabulary speech recognition accuracy. While great improvements have been made in recent years, no recognition algorithms or systems have been created which eliminate the possibility of recognition errors. If large vocabulary speech recognizers are going to be used for any tasks where exact recognition is critical, then the inevitable errors need to be eliminated in some way that is acceptable to the users of the system. That means that a user interface must be designed to allow the user to correct recognition errors.

The simplest error correction interface is to force the user to respeak the whole utterance numerous times until the recognizer identifies the proper words. That interface may be easy to design and build, but it meets with very low user acceptance due to the fact that the greater user investment of time does not lead to a greater likelihood of the error being corrected. That is because every time the word or utterance is repeated, it is treated as an independent event. Thus, if a person has an accent, or an unusual manner of saying a particular word, the repair system, because it continually treats each utterance as an independent event unrelated to all of the previous utterances of that word or phrase, might never identify the proper word or utterance.

Another interface design is to force the user to edit the recognized text with a keyboard or mouse-based editor. Though this method may guarantee correction of the errors, it requires the user to switch input modalities to accomplish a single task, and also eliminates many of the hands-free, eyes-free benefits of a speech interface.

Thus the need exists for a repair interface which allows the user to repair misrecognitions by voice only, in a way that is as natural and effective as in human to human communication such as by respeaking a misrecognized portion of an utterance, speaking more clearly, or hyperarticulating the word or word sequence which was misrecognized.

SUMMARY OF THE INVENTION

The present invention solves the foregoing problems by providing a method and apparatus for repairing speech recognized by a recognition engine of the type which generates an n-best list of hypotheses and scores for each hypothesis in response to the speech to be recognized. The method is comprised of the steps of receiving from a recognition engine a first n-best list or lattice of hypotheses, and scores for each hypothesis, generated in response to a primary utterance to be recognized. An error within the best hypothesis, that is the hypothesis having the highest score, is located using one of several different techniques. Control signals are generated based on the first n-best list. The control signals are input to the recognition engine. A second n-best list or lattice of hypotheses, and scores for each hypothesis, is generated from an event independent of the primary utterance and in accordance with the control signals. The scores for the hypotheses in the first n-best list are combined with the scores for the hypotheses in the second n-best list and the hypothesis having the highest combined score is selected.

The present invention enables the incorrectly recognized speech to be corrected through an event independent of the primary utterance. Thus, the method and apparatus of the present invention provides a user friendly, natural method of correcting recognized speech. Furthermore, by combining the scores from the first n-best list with the scores from the second n-best list, all of the information is used from both utterances to thereby improve the chances that the speech is correctly identified.

The present invention is also capable of correcting speech based on other events such as spelling a portion of the primary utterance, writing a portion of the primary utterance, or paraphrasing a portion of the primary utterance. When the event is something other than a respeaking of the primary utterance, the chances are improved that the speech will be corrected because not only is the event independent of the primary utterance, it is an event of a different kind such that the failure which occurred in identifying the primary utterance is unlikely to be repeated. Errors in recognized speech can be identified automatically or may be identified manually through some type of input such as the operation of a keyboard or mouse. However, errors can be automatically located by respeaking a portion of the primary utterance such that the input modality need not be changed. Those and other advantages and benefits of the present invention will be apparent from the Description of a Preferred Embodiment hereinbelow.

BRIEF DESCRIPTION OF THE DRAWINGS

For the present invention to be clearly understood and readily practiced, the present invention will be described in conjunction with the following figures wherein.

DESCRIPTION OF A PREFERRED EMBODIMENT

Figure 1:
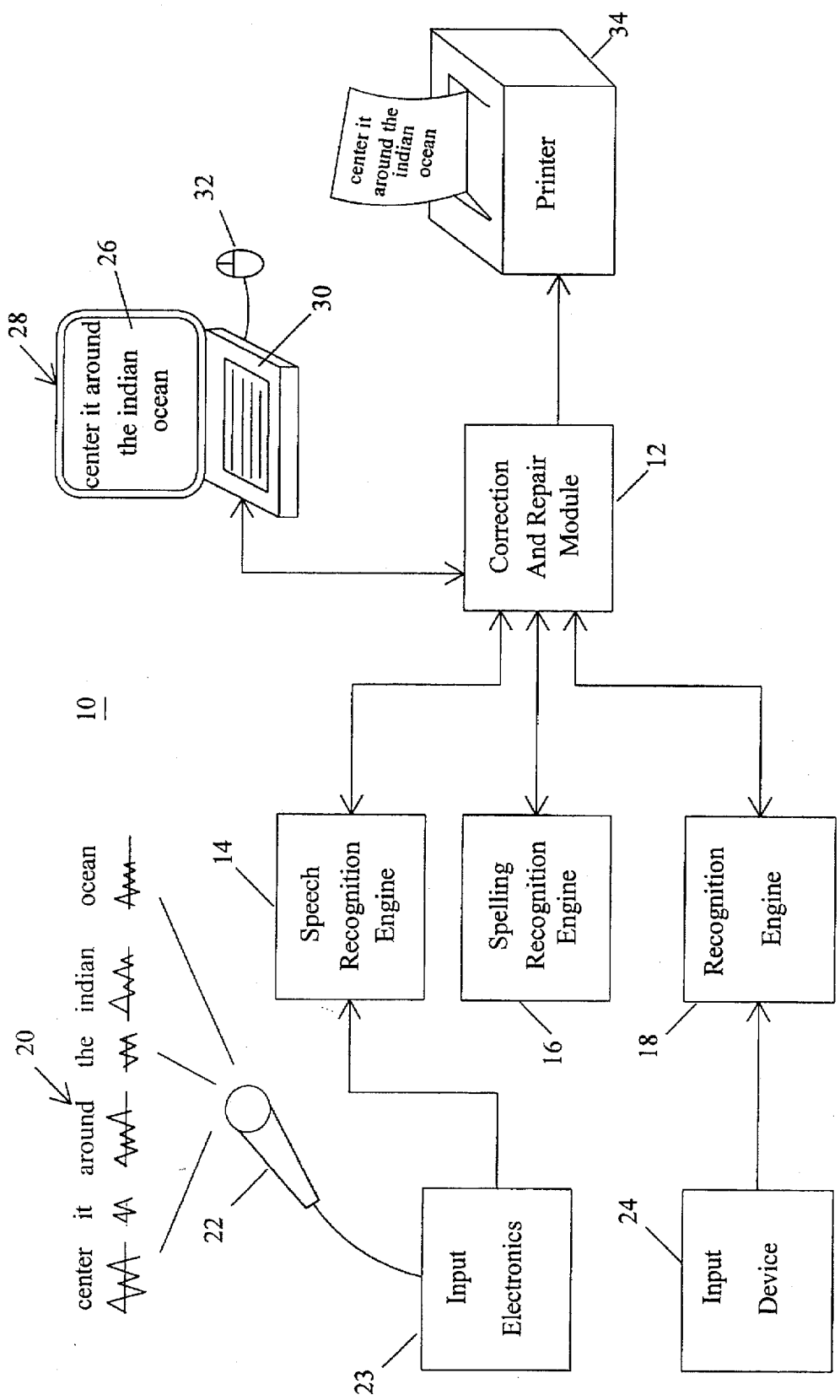
FIG. 1 is a block diagram illustrating a speech recognition system having a correction and repair module constructed according to the teachings of the present invention.

FIG. 1 is a block diagram illustrating a speech recognition system 10 having a correction and repair module 12 constructed according to the teachings of the present invention. The speech recognition system 10 also includes a commercially available speech recognition engine 14. The speech recognition engine 14 is a continuous recognizer which can switch language models quickly. The recognition engine 14 must also be able to output a segmented, scored, n-best list and/or word lattice. In our work, we have used an HMM continuous speech recognizer. The system 10 also includes a spelling recognition engine 16. For spelling, we used an MSTDNN-based continuous spelling recognizer. In the preferred embodiment, both recognition engines 14 and 16 use the same input format, which simplifies their use in one common interface, although that is not required to practice the present invention. The speech recognition engine 14 uses a trigram, bigram, or wordpair language model to constrain the hypothesis search while the spelling recognition engine 16 can use letter n-grams or finite-state grammars as discussed below. A third recognition engine 18, may be any suitable type of recognition engine such as a handwriting recognition engine.

The speech recognition engine 14 receives audio input, referred to as a primary utterance and generally designated 20, through a microphone 22 and input electronics 23 in a known manner. The output of the speech recognition engine 14 is input to the correction and repair module 12, the details of which will be described hereinbelow in conjunction with FIGS. 2 through 5. Feedback is provided from the correction and repair module 12 to the speech recognition engine 14 for the purpose of correcting and repairing the speech recognized by speech recognition engine 14 when the mode of correction is to respeak the incorrect word or words. The spelling recognition engine 16 cooperates with the correction and repair module 12 when the mode of correction is to spell the incorrect word or words.

The third recognition engine 18 receives input from an appropriate input device 24. Input device 24 may be a touch sensitive pad or any other input transducer and the third recognition engine 18 may be a handwriting recognition engine or any other device for data entry. Under such circumstances, the third recognition engine 18 cooperates with the correction and repair module 12 when the mode of correction is to write the correct word or words. Input device 24 and recognition engine 18 could take any suitable form to provide other correction modalities.

The output of the correction and repair module 12 may be displayed on a screen 26 of a computer 28. The computer 28 may be provided with standard input devices such as keyboard 30 and mouse 32. The correction and repair module 12 may be responsive to corrections input through the keyboard 30, use of the mouse 32 to select highlighted words on screen 26, or to other known input techniques. The output of the correction and repair module 12 may also be input to a printer 34 which provides a printed copy of the recognized speech.

Figure 2:
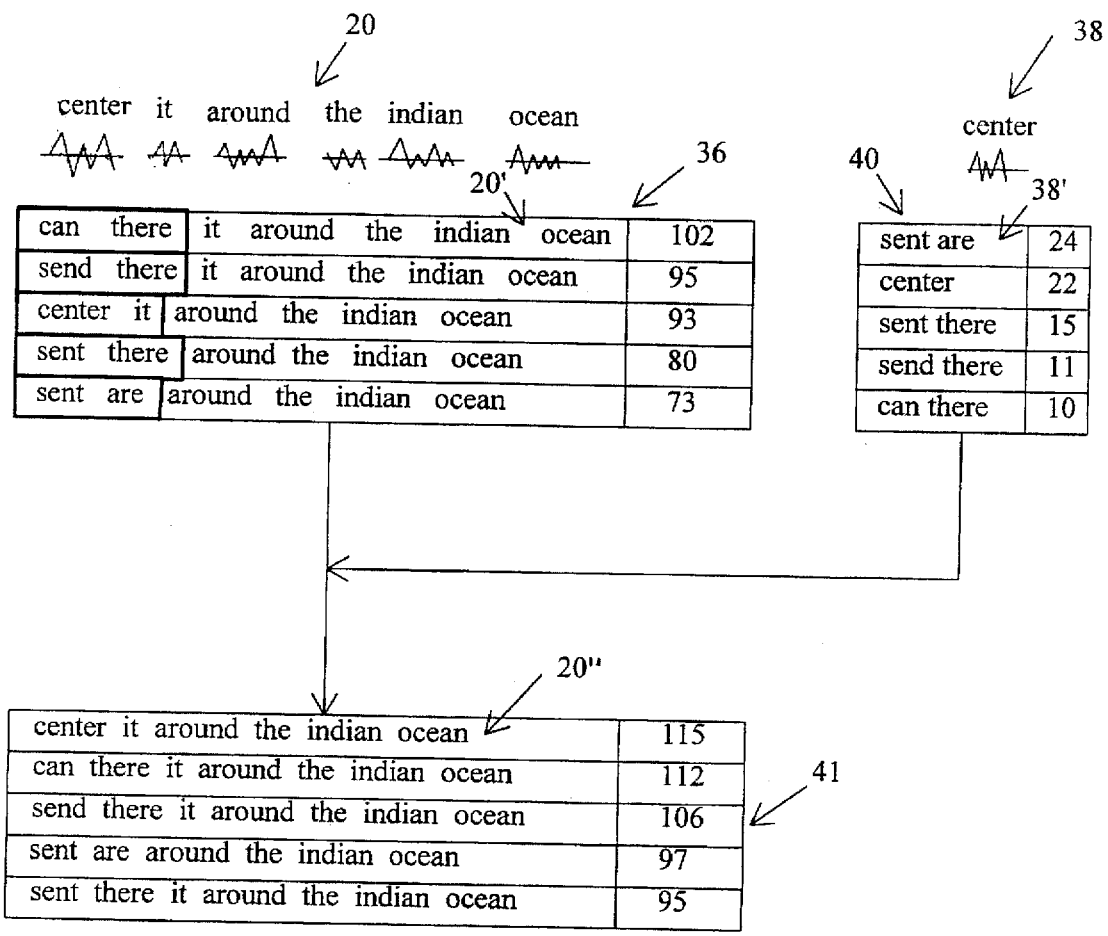
FIG. 2 illustrates the repair paradigm of the present invention.

FIG. 2 shows the repair paradigm used by the correction and repair module 12. The speaker first utters the primary utterance 20. The top (best) hypothesis in a primary recognition 36 is designated as 20'. If an error (as shown by the dotted box around the words "can there" in utterance 20') occurs, the speaker respeaks, or inputs information in some other manner such as spelling, writing, etc., the erroneous subsection of the primary utterance 20. In FIG. 2, a secondary or repair utterance 38 is shown. The top hypothesis in a secondary recognition 40 is designated as utterance 38'. The secondary utterance 38 is recognized using a language model constructed separately for the repair as discussed more fully below. The results of both recognitions 36 and 40 are then used to locate and/or repair the original error such that utterance 20" is the same as primary utterance 20 as shown in recognition 41.

Before an error can be corrected, the error must be located. We first describe one method of locating the error, the Automatic Subpiece Location. We then describe several methods for repairing or otherwise correcting the located error.

Automatic Subpiece Location

Figure 3:
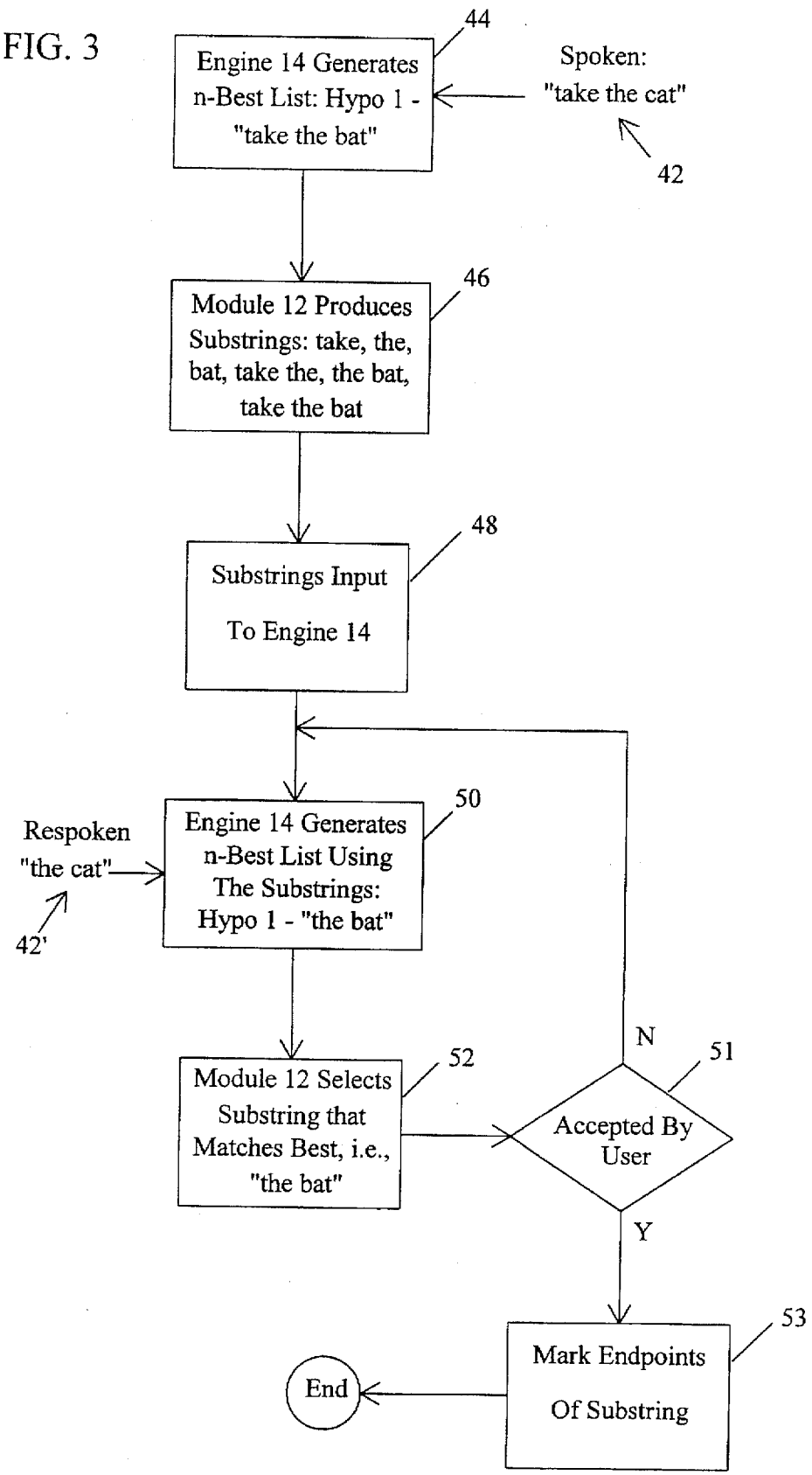
FIG. 3 is a flow chart illustrating the steps of one method performed by the speech recognition system illustrated in FIG. 1 of locating a subpiece for purposes of repairing the subpiece.

This technique is used when a primary utterance 42 in FIG. 3 has been spoken and the hypothesis output at step 44 by speech recognition engine 14 contains an error. One of the necessary pieces of information to repair an error is the location of that error in the primary utterance 42. That location could be determined, for example, with the use of the mouse 32 highlighting an errorful subsection of the recognition. In FIG. 3, we describe how to accomplish that highlighting by voice only, requiring the user to respeak only the errorful subsection of the primary utterance 42.

Given that the user will respeak some unknown subsection of the primary utterance 42, a language model is created in step 46 by the correction and repair module 12 by identifying all substrings of the first hypothesis of the primary recognition. Those substrings are then input at step 48 to speech recognition engine 14. A secondary utterance (a respeaking of a subpiece of the primary utterance) 42' is then run through the speech recognition engine 14 at step 50 which uses the newly constructed language model. That will produce a secondary n-best list of possible choices for the respoken subpiece 42'. Each hypothesis in the secondary n-best list (from best to worst) is evaluated to determine if it is a substring of the first hypothesis of the primary recognition at step 52. The best match is presented to the user at step 51, and if accepted by the user, the endpoints of that substring are returned as the location of the respoken subpiece at step 53 and the evaluation stops. If the best match does not result in, for example, the incorrect words being highlighted, the process is repeated beginning with step 50.

Correction And Repair Methods

Figure 4:
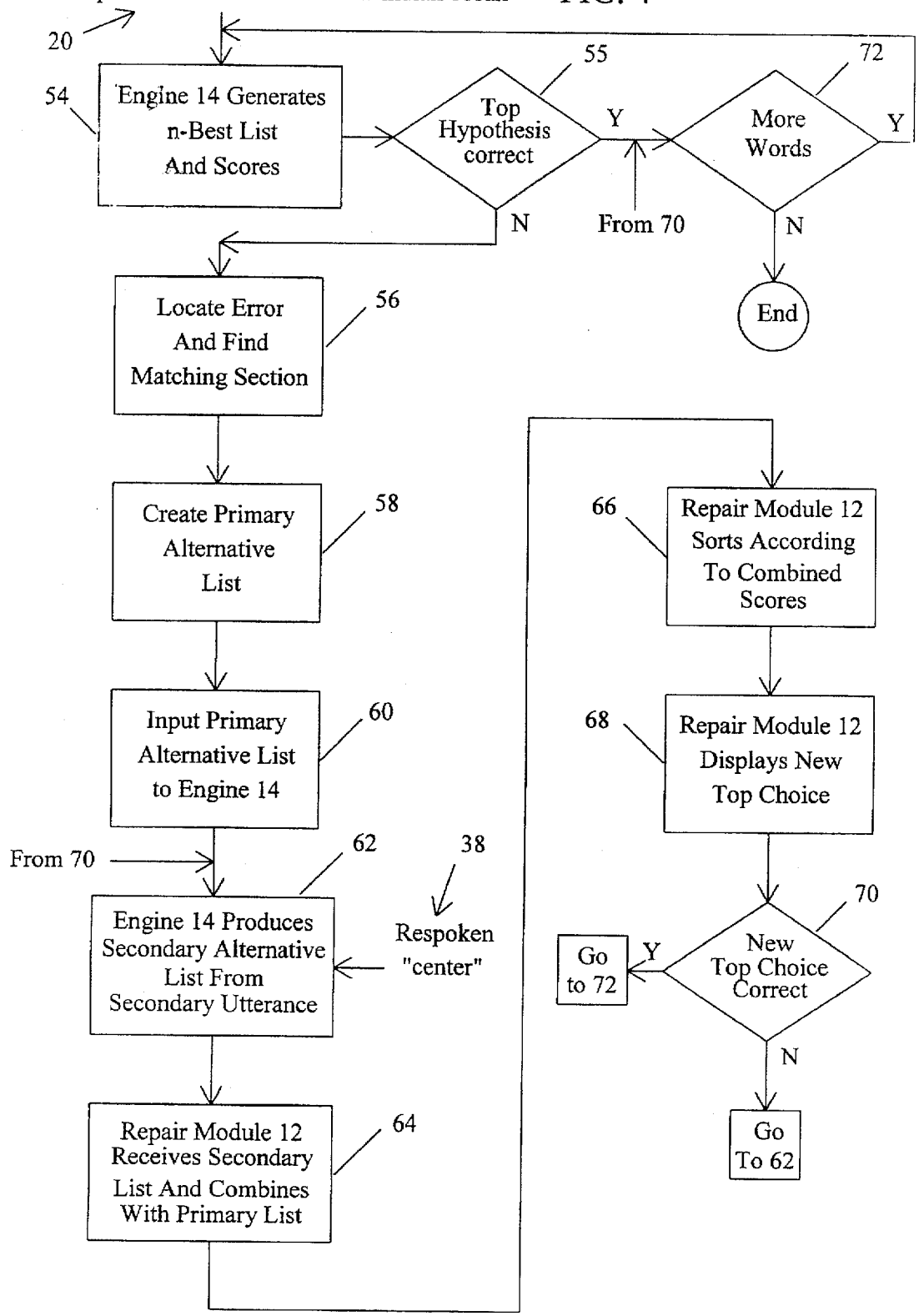
FIG. 4 is a flow chart illustrating the steps of one method performed by the speech recognition system illustrated in FIG. 1 of repairing machine-recognized speech based on the error being respoken.

FIG. 4 illustrates the steps of one method performed by the speech recognition system 10 illustrated in FIG. 1 of repairing speech improperly recognized by a machine. In FIG. 4, when primary utterance 20 is spoken, speech recognition engine 14 produces at step 54 the primary recognition, which is shown in FIG. 2 as 36. The primary n-best list may be of the following type:

| | |
|---|---|
| 1. can there it around the indian ocean | (score 102) |
| 2. send there it around the indian ocean | (score 95) |
| 3. center it around the indian ocean | (score 93) |
| 4. sent there around the indian ocean | (score 80) |
| 5. sent are around the indian ocean | (score 73) |

The primary n-best list is the input to the correction and repair module 12. If, at step 55, it is determined that the top hypothesis is correct, then speech recognition may continue if more words are to be recognized as shown by decision step 72. If the top hypothesis is not correct, then the system goes into a repair mode as shown by the "No" branch coming from step 55.

At step 56, the errorful sections in the hypothesis with the highest score are located. Error locating can be performed in several ways, one of which is explained herein in conjunction with FIG. 3. After the errorful section has been located, the repair module 12 finds the matching section in each hypothesis as follows:

| | |
|---|---|
| 1. [can there] it around the indian ocean | (score 102) |
| 2. [send there] it around the indian ocean | (score 95) |
| 3. [center] it around the indian ocean | (score 93) |
| 4. [sent there] around the indian ocean | (score 80) |
| 5. [sent are] around the indian ocean | (score 73) |

At step 58, repair module 12 extracts the score for subsections of each hypothesis by adding the word scores. That creates a primary alternative list as follows:

| | |
|---|---|
| 1. [can there] | (score 23) |
| 2. [send there] | (score 20) |
| 3. [center] | (score 19) |
| 4. [sent there] | (score 17) |
| 5. [sent are] | (score 14) |

At step 60, repair module 12 sends control signals to speech recognition engine 14 to constrain engine 14 to recognize only the word sequences in the primary alternative list in the secondary utterance 38. Speech recognition engine 14 then produces, at step 62, a secondary alternative list from the secondary utterance:

| | |
|---|---|
| 1. [sent are] | (score 24) |
| 2. [center] | (score 22) |
| 3. [sent there] | (score 15) |
| 4. [send there] | (score 11) |
| 5. [can there] | (score 10) |

The secondary alternative list is input to the repair module 14, as shown by step 64, which adds scores from the primary alternative list and the secondary alternative list:

| | |
|---|---|
| [can there] | 23 + 10 = 33 |
| [send there] | 20 + 11 = 31 |
| [center] | 19 + 22 = 41 |
| [sent there] | 17 + 15 = 32 |
| [sent are] | 14 + 24 = 38 |

At step 66, the module 12 sorts according to the new summed score:

| | |
|---|---|
| [center] | 19 + 22 = 41 |
| [sent are] | 14 + 24 = 38 |
| [can there] | 23 + 10 = 33 |
| [sent there] | 17 + 15 = 32 |
| [send there] | 20 + 11 = 31 |

At step 68, repair module 12 replaces the highlighted section with the new top-choice, displays it, prints it, etc. as the corrected hypothesis:

| |
|---|
| [center] it around the indian ocean |

At step 70, the user decides if the new top choice is correct. If yes, the process proceeds with decision step 72. If the new top choice is not correct, the process returns to step 62 where the secondary utterance is respoken.

The advantage of the method of the present invention is that the information learned from the primary utterance is combined with the information learned from the secondary utterance to improve the probability that the new top choice is correct. In prior art systems, the secondary utterance is treated as an independent event such that the probability that the secondary utterance will be recognized correctly is no greater than the probability that the primary utterance will be recognized correctly. However, in the present invention, by combining the weights from both the primary and secondary utterance, the probability is increased that the new top choice is correct. If a tertiary utterance is provided, the scores from the tertiary utterance are combined with those from the secondary and primary utterances to again increase the probability that the new top choice is correct.

It should be noted that although in the present example the scores are combined simply by addition, other types of combinations are possible. Additionally, it is possible to weight scores so that certain hypotheses are preferred. For example, one might presume that in a tertiary utterance, the speaker is at this point enunciating very clearly so that the hypotheses from the tertiary utterance would be given a greater weight than hypotheses from the primary utterance.

The process flow in FIG. 4 could be modified to substitute the spelling recognition engine 16 in place of the speech recognition engine 14 with respect to processing of the second utterance 38. Repairing a recognition with spelling is very similar to correction by speech. Again, given the location of an errorful section, a secondary utterance and search can be used to repair the primary recognition. In this case, the secondary utterance is a spelling of the correct words for the subsection that contained the error. That is, the process would be identical to the spoken repetition except that the primary alternative list created in step 58 would be formed into a sequence of letters:

| | |
|---|---|
| 1. [C A N T H E R E] | (Score 23) |
| 2. [S E N D T H E R E] | (Score 20) |
| 3. [C E N T E R] | (Score 19) |
| 4. [S E N T T H E R E] | (Score 17) |
| 5. [S E N T A R E] | (Score 14) |

In step 60, the repair module 12 sends control signals to spelling recognition engine 16 to constrain it to recognize only the letter sequences in the primary alternative list set forth above. Now, spelling recognition engine 16 receives a secondary utterance 38 which is spelled "C E N T E R".

Spelling recognition engine 16 produces the following secondary alternative list from the spelled secondary utterance:

| | |
|---|---|
| 1. [C E N T E R] | (Score 24) |
| 2. [S E N T A R E] | (Score 22) |
| 3. [C A N T H E R E] | (Score 17) |
| 4. [S E N T T H E R E] | (Score 15) |
| 5. [S E N D T H E R E] | (Score 11) |

Thereafter, the repair module, at step 64, adds the scores as before and the remainder of the process is carried out in the same fashion.

Yet another way for the process of FIG. 4 to be expanded is to use as recognition engine 18 a handwriting recognition engine in combination with the input device 24. Given an incorrect section which has been highlighted as in step 56, a handwriting recognizer can also be constrained by the repair module 12 to only recognize and score the words or sequences from the primary alternative list. The repair module can then take the scored n-best list from the handwriting recognition engine 18 and combine those scores with the primary alternative list as discussed above.

Thus it is seen that the correction and repair method of the present invention can be used with a variety of processes for identifying the error to be corrected. Furthermore, the method and apparatus of the present invention can be used with a wide variety of techniques for developing information to correct the machine recognized speech such as speech to speech correction, speech to spelling correction, and speech to writing correction. One common thread through all of those embodiments is that the repetition, although independent of the primary utterance, is not treated as an independent event. As will be seen from the experimental data set forth below, the best results may be achieved when the repetition takes a different form than speech, i.e. speech to spelling or speech to writing, such that the effects of accents and mistakes in enunciation can be minimized.

Building upon the foregoing, the apparatus and method of the present invention can be extended to allow the user to correct the original recognition by uttering a paraphrase. Such a method is set forth in FIG. 5.

Figure 5:
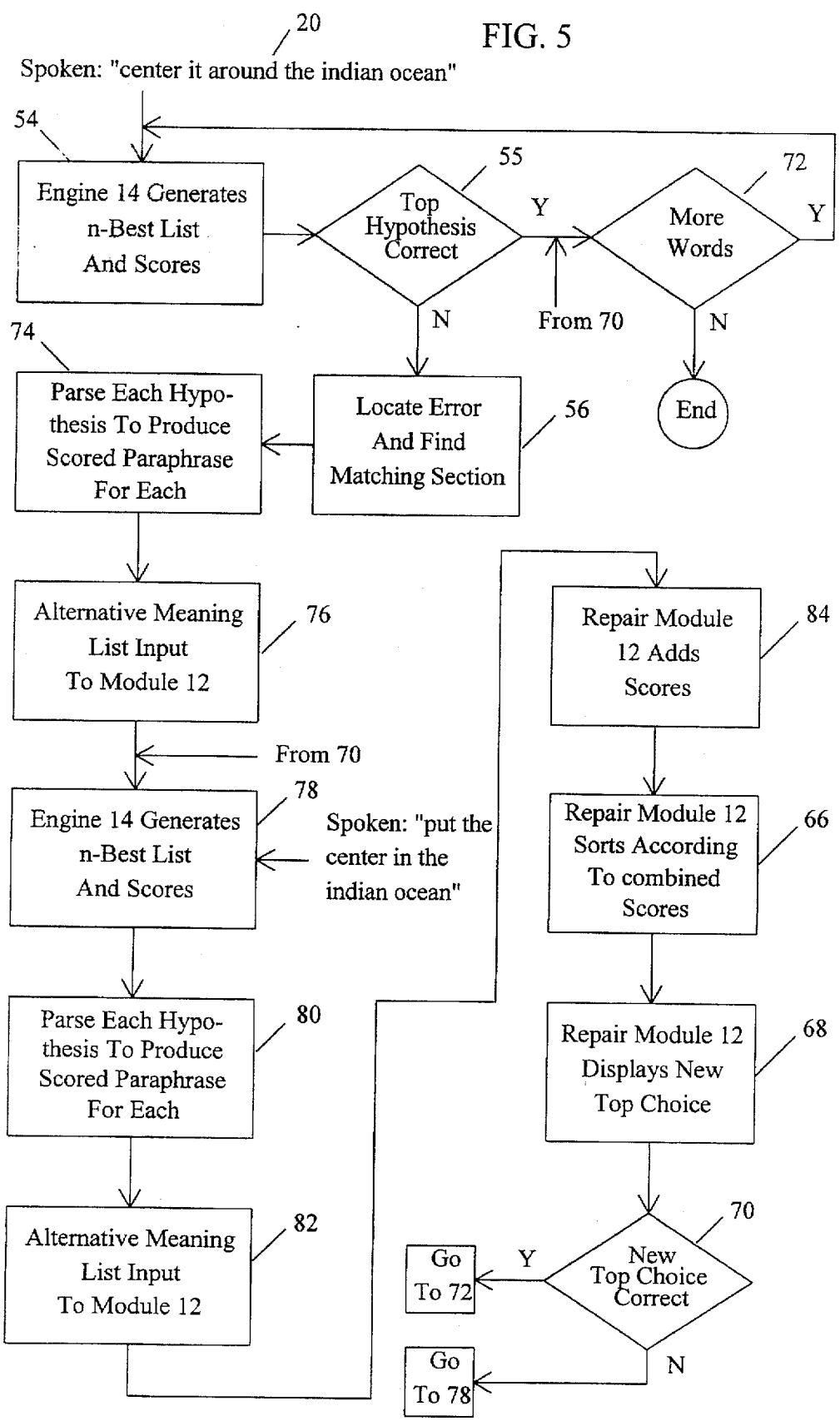
FIG. 5 is a flow chart illustrating the steps of another method performed by the speech recognition system illustrated in FIG. 1 of repairing machine-recognized speech based on a paraphrase of the error being spoken.

In FIG. 5, the original utterance 20 is spoken. As in the previous examples, the speech recognition engine 14 generates, at step 54, the n-best list:

| | |
|---|---|
| 1. can there it around the indian ocean | (score 102) |
| 2. send there it around the indian ocean | (score 95) |
| 3. center it around the indian ocean | (score 93) |
| 4. sent there around the indian ocean | (score 80) |
| 5. sent are around the indian ocean | (score 73) |

If the top hypothesis is correct as determined at step 55, the engine 14 is free to continue to recognize speech. However, if the top hypothesis is not correct. The error is located and the matching section found at step 56. Each hypothesis in the n-best list is sent through a parser which produces, at step 74, a scored paraphrase for each. Any paraphrases which are the same are combined. That produces an alternative meaning list of the following type which is input to the repair module 12 at step 76.

| | |
|---|---|
| 1. is it near the indian ocean | (score 1020) |
| 2. send it near the indian ocean | (score 950) |
| 3. move the center to the indian ocean | (score 930) |
| 4 & 5. it was sent to the indian ocean | (score 800) |

The user speaks a paraphrase of the correct meaning, "Put the center in the Indian Ocean." The recognition engine 14 is run on this utterance, at step 78, producing a second scored n-best list:

| | |
|---|---|
| 1. but the center in the indian ocean | (score 150) |
| 2. put the center in the indian ocean | (score 148) |
| 3. but the center is the indian ocean | (score 130) |
| 4. gut the center in the indian ocean | (score 121) |
| 5. put was sent where in the indian ocean | (score 110) |

The second n-best list is parsed at step 80 into the following second paraphrase list, which is input to the repair module 12 at step 82:

| | |
|---|---|
| 1. the center is in the indian ocean | (score 1500) |
| 2. move the center to the indian ocean | (score 1480) |
| 3. the indian ocean is the center | (score 1300) |
| 4. remove the contents of the center in the indian ocean | (score 1210) |
| 5. where in the indian ocean was it sent | (score 1100) |

The repair module 12 combines the first and second paraphrase lists in step 84 by adding scores for paraphrases that appear in both lists (shown here sorted):

| | |
|---|---|
| 1. move the center to the indian ocean | (score 2500) |
| 2. the center is in the indian ocean | (score 1500) |
| 3. the indian ocean is the center | (score 1300) |
| 4. remove the contents of the center in the indian ocean | (score 1210) |
| 5. where in the indian ocean was it sent | (score 1100) |
| 6. is it near the indian ocean | (score 1020) |
| 7. it was sent to the indian ocean | (score 800) |

Thereafter, the process is the same as the process shown in FIG. 4 with the repair module 12 sorting according to the combined scores, displaying the new top choice, etc.

Test Results

As previously discussed, merely replacing the errorful sub-section with the top hypothesis from the secondary recognition means that all of the subpiece order information from the n-best list is unused. In the experiments, we made use of that information by implementing a method according to the present invention which rescores and reorders the secondary recognition list by averaging the scores from the secondary recognition list with scores of identical subpieces in the primary recognition list.

The U.S. Government defined Resource Management task was used for our experiments. The specific set of utterances chosen consisted of all the male utterances from the February and October 1989 official test data. That included 390 utterances, in which were 300 unique sentences.

In experiment 1, the original speakers' utterances were used as the primary utterance and, in those cases where recognition errors occurred, a separate speaker recorded both the respoken and spelled repair utterances.

In experiment 2, the same speaker spoke all 390 primary utterances as well as the respoken repair utterances for those primary utterances that were misrecognized. For those experiments, the continuous speech recognition engine 14 was run in a sub-optimal mode to generate more errorful tokens over our test database.

Table 1 shows the primary recognition accuracies for the continuous speech recognition engine 14 in both experiments. Table 1 also shows the success of the automatic subpiece location method, and how often the correct replacement for an errorful subpiece was in the n-best list (N=50). Using the automatic subpiece location method disclosed herein, there is some possibility that no subpiece will be found because wordpair language models are not strong enough to guarantee that result. A finite state grammar to constrain the search would be able to guarantee that only exact substrings are produced. However, in the experiments reported here, wordpair models were found to be sufficient, always producing some subpiece within the first five secondary recognition hypotheses.

There is also the problem that there might be multiple, identical subpieces in the primary recognition first hypothesis. In that case, recognizing exactly what sequence of words was respoken is not enough to determine which of any identical sequences in the utterance was respoken. That problem would be most prevalent in commonly repetitive strings of numbers or letters. For the current experiments, the first matching subpiece (scanned in normal reading order) in the primary recognition hypothesis was used. Though other selection criteria could be used, that simple method was found to work well for a mostly non-repetitive resource management task. As might be expected, preliminary testing of this method showed that it works poorly if the subpiece to be located is only one or two short words. That problem, however, is not seen much in actual usage because humans tend to respeak a few words around the error to make it easier for other humans to locate the exact position in the utterance where the misrecognition occurred.

TABLE 1

| | Recognition Accuracies Before Repair | |
|---|---|---|
| Statistic | Experiment 1 | Experiment 2 |
| Word Accuracy | 93.1% | 88.6% |
| Sentence Accuracy | 63.1% | 46.7% |
| Auto-Locate Success | 83.3% | 90.6% |
| Correct in n-best | 91.0% | 83.7% |

Table 2 shows the success rates for the various repair methods in both experiments. The column labeled "Highlight" reports the results when the errorful section was highlighted exactly by hand. The other column gives the results when the highlighting was with the automatic subpiece location method described above.

In our experiments, all the words are spelled together with no break for word boundaries. A string of words like "GET ME ANY" would be spoken as "G-E-T-M-E-A-N-Y". Again, a language model is created from the subpiece hypotheses in the same position as the errorful subsection in the primary n-best list. For spelling, that language model is a finite state grammar which completely restricts the output of the spelling recognition engine 16 to exact alternatives to the highlighted test, i.e., the spelling recognition engine 16 does not produce an n-best list or letter lattice. The subpiece that was recognized by the spelling recognition engine 16 is then used to replace the errorful subpiece in the original hypothesis.

Another method tried is to let the spelling recognition engine 16 do a free recognition (no language model), and then score each possible subpiece by the number of characters which differ from the recognized sequence. That gave a score for each subpiece which allowed the combination of scores from the spelling recognition engine 16 and the primary n-best list to come up with the best replacement subpiece.

In the experiments reported here, the language model used was a simple bigram model (no unseen wordpair probability) based only on the counts found in the appropriate subpieces of the n-best list. To find all the possible subpieces in the n-best list which were alternatives for the highlighted section of the best hypothesis, the start and end frames of the highlighted section were determined. In all other n-best hypotheses, the subpiece was chosen to include any words between or overlapping these start and end frames. Only unique substrings were used to determine the counts for the bigram language model. The original subpiece (known to contain at least one error) is also excluded from the language model data so that it cannot reoccur.

TABLE 2

Repair Method Success Rates

| Repair Method | Highlight | Auto-Locate |
| --- | --- | --- |
| Exp. 1: Speak | 70.1% | 64.6% |
| Exp. 1: Spell | 82.6% | 70.8% |
| Exp. 1: Speak + Spell | 84.0% | 73.6% |
| Exp. 2: Speak | 67.4% | 62.7% |

Table 3 shows the improvements in overall sentence accuracy when using the separate and combined repair mechanisms with prehighlighted error regions.

TABLE 3

Improvement of Sentence Accuracy

| Repair Method | Sentence Accuracy |
| --- | --- |
| None (baseline) | 63.1% |
| Speak | 83.8% |
| Spell | 88.5% |
| Speak + Spell | 89.0% |

The assumption that the correct transcription for the subpiece must be in the n-best list somewhere definitely restricts the possible situations that can be repaired although, for our speech recognition system 10, with 50 hypotheses in each n-best list, the correct subpiece was contained in the n-best list about 85% of the time overall. Increasing "n" would increase the likelihood of the correct alternative existing in the n-best list and should increase the repair success rates further. Our results indicate that repeating or spelling a misrecognized subsection of an utterance can be an effective way of repairing more than two thirds of recognition errors.

While the present invention has been described in conjunction with preferred embodiments thereof, those of ordinary skill in the art will recognize that many modifications and variations may be implemented. The present disclosure and the following claims are intended to encompass all such modifications and variations.

What is claimed is:

1. A method of repairing speech recognized by a recognition engine of the type which generates an n-best list of hypotheses and scores for each hypothesis in response to the speech to be recognized, said method comprising the steps of:

receiving from a recognition engine a first n-best list of hypotheses, and scores for each hypothesis, generated in response to a primary utterance to be recognized;

locating an error within the hypothesis having the highest score;

generating control signals from said first n-best list;

inputting said control signals to said recognition engine; generating a second n-best list of hypotheses, and scores for each hypothesis, from an event independent of the primary utterance in accordance with said control signals;

combining the scores for the hypotheses in the first n-best list with the scores for the hypotheses in the second n-best list;

selecting the hypothesis having the highest combined score; and replacing the located error with the selected hypothesis.

2. The method of claim 1 additionally comprising the step of displaying the selected hypothesis to a user and, if the selected hypothesis is correct, performing the step of replacing the located error with the selected hypothesis.

3. The method of claim 2 additionally comprising the step of repeating the method in the event that the selected hypothesis is incorrect.

4. The method of claim 1 wherein said step of generating a second n-best list includes the step of generating a second n-best list from an event which includes a secondary utterance.

5. The method of claim 4 wherein said secondary utterance includes a respeaking of at least a portion of the primary utterance.

6. The method of claim 4 wherein said secondary utterance includes spelling at least a portion of said primary utterance.

7. The method of claim 1 wherein said step of generating a second n-best list includes the step of generating a second n-best list from an event which includes writing at least a portion of the primary utterance.

8. The method of claim 1 wherein said step of combining the scores for the hypotheses includes the step of adding the scores for each hypothesis.

9. The method of claim 1 additionally comprising the step of weighting the hypotheses, and wherein said step of combining the scores for the hypotheses includes the step of adjusting the score for each hypothesis based on the weight assigned to that hypothesis before combining the scores.

10. The method of claim 1 wherein said step of locating an error within the hypothesis having the highest score includes the step of highlighting the error by using a mouse.

11. The method of claim 1 wherein said step of locating an error within the hypothesis having the highest score includes the step of highlighting the error by using a keyboard.

12. The method of claim 1 wherein said step of locating an error within the hypothesis having the highest score includes the step of respeaking the portion of the primary utterance that is in error.

13. A method of repairing speech recognized by a recognition engine of the type which generates an n-best list of hypotheses and scores for each hypothesis in response to the speech to be recognized, said method comprising the steps of:

receiving from a recognition engine a first n-best list of hypotheses, and scores for each hypothesis, generated in response to a primary utterance to be recognized;

locating an error within the hypothesis having the highest score;

parsing each hypothesis in said first n-best list to produced a scored paraphrase for each;

receiving from said recognition engine a second n-best list of hypotheses, and scores for each hypothesis, generated in response to a secondary utterance which is a paraphrase of said primary utterance;

parsing each hypothesis in said second n-best list to produced a scored paraphrase for each;

combining the scores for the paraphrases from the first n-best list with the scores for the paraphrases from the second n-best list;

selecting the paraphrase having the highest combined score; and replacing the located error with the selected paraphrase.

14. A speech recognition and repair apparatus for use in a speech recognition system of the type including a recognition engine which generates an n-best list of hypotheses and scores for each hypothesis in response to the speech to be recognized, said apparatus comprising:

means for receiving from a recognition engine a first n-best list of hypotheses, and scores for each hypothesis, generated in response to a primary utterance to be recognized;

means for locating an error within the hypothesis having the best score;

means for generating control signals from said first n-best list, said control signals being input to the recognition engine to constrain the selection of hypotheses;

means for receiving from the recognition engine a second n-best list of hypotheses, and scores for each hypothesis, generated in response to an event independent of the primary utterance and in accordance with said control signals;

means for combining the scores for the hypotheses in the first n-best list with the scores for the hypotheses in the second n-best list; and means for replacing the located error with the hypothesis having the best combined score.

* * * * *